Figure 1:
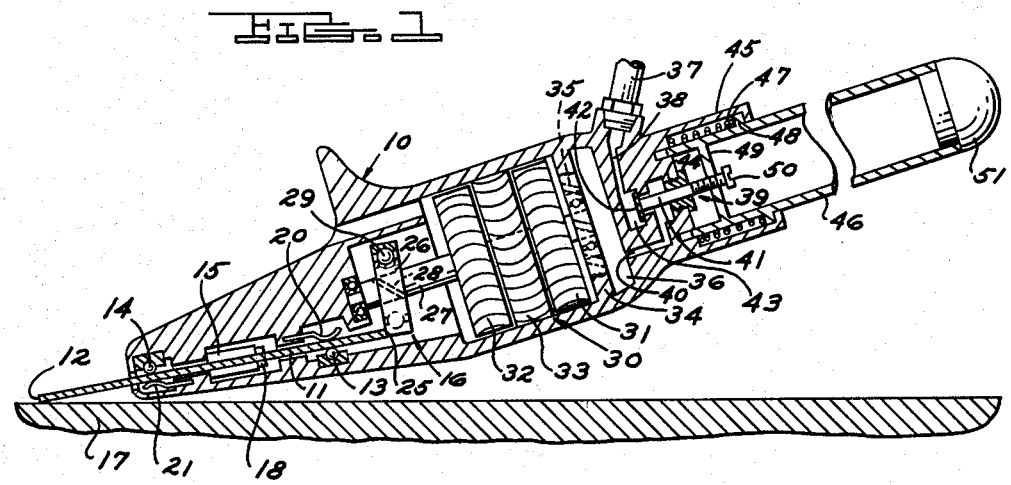

Sept. 8, 1964  R. J. ASPEEK  3,147,548
POWER SCRAPER TOOL
Filed May 17, 1962

INVENTOR.
REGINALD J ASPEEK
BY
ATTORNEY

3,147,548
POWER SCRAPER TOOL
Reginald J. Aspeek, 8402 Millis Road, Utica, Mich.
Filed May 17, 1962, Ser. No. 195,560
1 Claim. (Cl. 30—272)

This invention relates to power scraping tools and in particular to a scraping tool having a blade which is driven only in outward scraping pulses only during the forward scraping stroke of the entire tool with the outward blade pulses being smoothly accelerated and decelerated.

Scraping tools and power scraping tools are used in industry to remove small amounts of material from "high spots" after they have been finished as smooth or as flat as can be accomplished by precision machine tools. These high spots are left on workpieces by precision machine tools for many reasons. One reason may be that the spot is relatively harder than the surrounding material of the workpiece. Another reason may be that temperature variation changes the relationship of the machine tool and workpiece at the time the spot was being machined. Many other reasons may be advanced to account for the high spots occurring in workpieces.

Precision inspection reveals the presence of the high spots. They are marked out on the workpiece and must be removed by scraping the excess material from the workpiece surface. A scraping tool is employed for this purpose. It may be a hand tool or a power driven scraping tool. Hand tools have been found inadequatae to do a satisfactory economical scraping job as they require a highly skilled workman and a long period of time.

Power driven scraping tools have been resorted to by industry as they do not require such highly skilled workmen and because they are faster in operation. However, the power driven scraping tools of the prior art must be very carefully used because their blades are reciprocated by positive power means in both inward and outward blade pulses. Further, the blade is power pulse driven bi-directionally both during the forward and rearward scraping movement of the entire tool relative to the workpiece surface.

It has been found with a bi-directionally powered blade that the blade digs, nicks, and mars the workpiece surface when the operator releases his manual pressure on the tool and during the rearward scraping stroke of the entire tool. With the blade pulses power reciprocating in both directions, it may deliver the blade in a blow against the surface of the workpiece during the rearward stroke of the entire tool. This causes the nicks and mars occasioned in the use of scraping tools having bi-directionally powered scraping blades.

In the prior art power driven scraping tools, the bi-directionally powered blade is power withdrawn as well as power advanced. This action relative to a workpiece surface can best be understood when the tool power mechanism is running under power but when the operator is holding the tool stationary with the blade in contact with the workpiece. Here the blade moves a powered reciprocating scraping stroke against the workpiece forwardly and rearwardly equal to the length of the blade power stroke. This scrapes the workpiece over the length of the blade power stroke travel in spite of the fact that the operator is not moving the tool in a forward scraping stroke. This allows the blade to scrape in an isolated area in repeated equi-distant strokes.

Thus, when the blade is power withdrawn in a powered retracting stroke in the prior art devices in conjunction with forward manual tool movement, the blade withdraws from its farthest advanced stroke point on the workpiece. It withdraws from the advanced point and then advances over the point in staggered overlapping strokes. In other words, the blade advances to its farthest power driven point of travel at a point on the workpiece and then withdraws from that point on the workpiece. It therefore re-travels a portion of its old stroke and a portion of its new stroke relative to a point on the workpiece surface. It does this in a rapid series of overlapping movements relative to a series of points to which the blade successively advances in power strokes. Thus, the blade successively withdraws from its advanced power stroke point on the workpiece and then overtravels the point. The blade never stops at its farthest advanced power stroke point. The blade never advances from this point in its next stroke but rather starts behind it and then moves over it.

Thus, with the prior art devices powered in both the advancing and retracting strokes there is full repetition of blade power stroke in a workpiece area when the whole tool is not being advanced manually. Also there is partial repetition of blade power stroke in a workpiece area when the whole tool is being advanced manually. This is due to the fact that the blade is subject to power withdrawal. This produces partial repetition and full repetition.

In the device of the invention there is no partial repetition or full repetition of blade power stroke. The blade is never pulled back from its point of farthest travel relative to a workpiece surface. The blade always advances from the farthest point of advanced travel of its previous stroke. The blade is never withdrawn at all relative to the tool housing. The tool housing must overtravel the blade to effect relative withdrawal. This relative withdrawal is relative to the tool housing. Relative to the workpiece the tool never withdraws.

Thus, when the device of the invention is running under power but is not being advanced manually, the blade is not reciprocated because the housing is not advancing to effect the relative withdrawal relative to the housing.

Thus, when the device of the invention is running under power and is being advanced manually, the blade is never power withdrawn from the farthest point of each power stroke and must make its next power stroke forward from the last stroke farthest advanced point. Thus, there is no partial or full repetition of power stroke in the device of the invention.

With the foregoing in view, it is a primary object of the invention to provide a power scraper tool wherein the blade is never power withdrawn relative to a workpiece surface.

An object of the invention is to provide a power scraper tool which leaves the blade standing relative to the workpiece surface at the point of farthest advancement in a power stroke.

An object of the invention is to provide a power scraper tool which starts each blade advance power stroke relative to the workpiece surface at the point of farthest advancement of the last forward stroke.

An object of the invention is to provide a power scraper tool wherein the blade is easily insertable and removable and without mechanical connection to the reciprocating means.

An object of the invention is to provide a power scraping tool where only the blade moves in a power advance stroke thereby obviating moving the blade in a retracting stroke and also obviating moving the connecting means in both directions.

An object of the invention is to provide a power scraper tool not having a mechanical connection reciprocating the blade to obviate the necessity of driving the mechanical connection.

It is a primary object of the invention to provide a power scraping tool having a blade which is neither mechanically connected to the power reciprocating means nor mechanically returned into contact with the power reciprocating means.

An object of the invention is to provide a power scraping tool wherein the blade is pulse driven only outwardly by the power means.

An object of the invention is to provide a power scraping tool wherein the blade is pulse driven outwardly only during periods when the entire tool is being moved forwardly in an advancing scraping stroke.

An object of the invention is to provide a power scraping tool wherein the blade is not pulse driven during periods when the entire tool is being moved rearwardly in a retracting scraping stroke.

An object of the invention is to provide a power scraping tool having a blade which is normally out of contact with the reciprocating power means.

An object of the invention is to provide a power scraping tool having a blade which is moved inwardly into contact with the power reciprocating means by workpiece surface engagement.

An object of the invention is to provide a power scraping tool having a blade which is moved inwardly into contact with the power reciprocating means by workpiece surface engagement only during a forward scraping stroke of the entire tool.

An object of the invention is to move the blade inwardly against the power reciprocating means by the inward force applied to the blade by contact with a workpiece surface during a forward scraping stroke of the entire tool.

An object of the invention is to provide a power reciprocating means which moves in a sine wave motion having smooth gradual acceleration and deceleration in the outward blade power pulse.

An object of the invention is to provide a power reciprocating means which also moves in a sine wave motion having smooth gradual acceleration and deceleration in the inward direction of blade travel to allow smooth blade return against the power reciprocating means.

An object of the invention is to provide a power reciprocating means which gradually accelerates and decelerates in both directions to eliminate any hammer blow action in the drive relative to the blade.

An object of the invention is to provide a powered scraping tool which automatically disconnects the blade from the power reciprocating means when the entire tool is moved in a rearward scraping stroke or when the tool is lifted out of contact with a workpiece.

An object of the invention is to provide a power scraping tool having a powered reciprocation in only the forward direction co-ordinated to the normal speed and length of scraping motion of the entire tool as used by workmen.

An object of the invention is to provide a high speed relative to small travel blade outward power pulse so as to rapidly remove minute portions of material from a workpiece surface.

An object of the invention is to provide a two speed reciprocating means, such as an air powered motor, for driving the reciprocating means which operates automatically at a relatively very high speed during the forward scraping stroke and operates at a relatively slower speed during the rearward scraping stroke and while idle.

Figure 2:
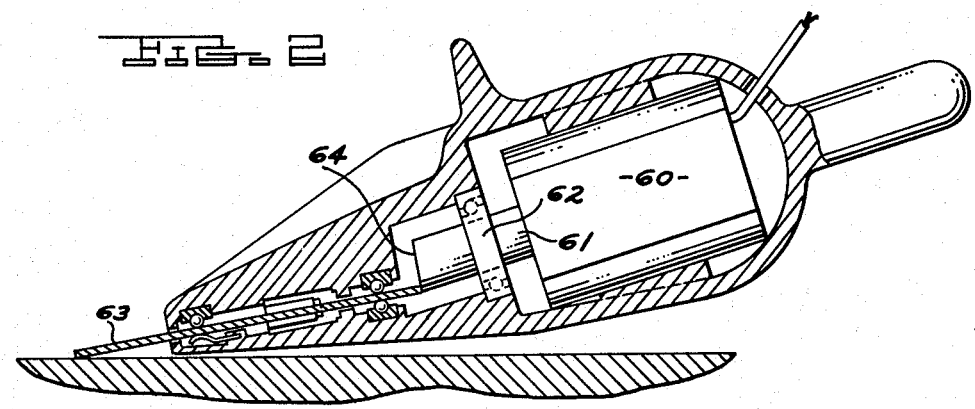

These and other objects of the invention will become apparent by reference to the following description of a power scraping tool embodying the invention taken in connection with the accompanying drawing in which:

FIG. 1 is a longitudinal cross-sectional view of an air driven scraping tool embodying the invention; and FIG. 2 is a longitudinal cross-sectional view of an electrically driven scraping tool embodying the invention.

Referring now to the drawing, a power scraper tool shown therein to illustrate a preferred embodiment of the invention comprises a housing 10, a blade 11 in the housing 10 having a scraping end 12 extending outside the housing 10, bearings 13, 14, and 15 supporting the blade 11 in the housing 10 against lateral movement while permitting free endwise movement of the blade 11, and reciprocating means 16 powered by a suitable motor driving the blade 11 endwise outwardly when in contact with the blade 11.

The blade 11 normally lies out of contact with the reciprocating means 16. The blade 11 is moved into contact with the reciprocating means 16 only when the housing 10 is moved in a forward scraping stroke with the blade scraping end 12 in contact with the surface of the workpiece 17. The blade scraping end 12 scrapes into the workpiece 17 surface in conjunction with a forward scraping stroke of the housing 10 and forces the blade 11 inwardly against the reciprocating means 16. In a forward scraping stroke movement of the housing 10 over a travel of 6 or 7 inches of workpiece 17 surface, blade 11 is continually driven inwardly into contact with the reciprocating means 16 by scraping contact with the workpiece 17. The blade is continually power driven outwardly by the reciprocating means 16 during the forward stroke travel of the scraping tool.

Immediately upon terminating forward scraping stroke travel of the entire tool, the blade 11 is not forced inwardly by its reaction with the workpiece 17 against the reciprocating means 16 thereby disconnecting power driving action of the reciprocating means 16 relative to the blade 11. This also occurs upon lifting the blade scraping end 12 above a workpiece as the reciprocating means 16 moves the blade 11 outwardly. Since the blade scraping end 12 is out of contact with the workpiece surface there is no return inward travel of the blade 11 against the reciprocating means 16.

Also immediately upon and during the rearward scraping stroke of the entire tool, the reaction of the blade scraping end 12 and the workpiece surface 17 terminates relative to moving the blade 11 inwardly against the reciprocating means 16. This leaves the blade out of contact with the reciprocating means. This insures that no power driven outward pulse of the blade 11 occurs during a retracting scraping stroke of the entire tool.

More particularly, spring fingers 20 may be mounted on the housing 10 to bear against the blade to hold it in contact with the bearings 13. Also spring fingers 21 may be mounted on the housing 10 to hold the blade in contact with the bearings 14. The bearings 15 are side slide channels and prevent sidewise movement of the blade 11. Downward pressure on the housing 10 by the workman drives the bearing 14 downwardly on the blade 11 which pressure transfers to the blade scraping end 12 and this is reacted against the bearings 13. The bearings anti-frictionally support the blade 11 under the downward pressure exerted by the workman which may be a pressure between 25 and 75 pounds. This pressure forcefully engages the blade scraping end 12 with the surface of the workpiece 17.

When the housing 10 is moved forwardly with the blade scraping end 12 in engagement with the workpiece 17, the blade 11 is pulled outwardly of the housing 10 by the force of the engagement and lies out of contact with the reciprocating means 16. A stop 18 is provided on the blade 11 and may contact the housing 10 or a bearing 15 to limit outward movement of the blade 11.

When the housing 10 is moved forewardly with the blade scraping end 12 in engagement with the surface of the workpiece 17, the blade 11 moves inwardly of the housing 10 against the reciprocating means 16 by the inward force of the engagement. Inward movement of the blade 11 is stopped by the reciprocating means 16.

The blade 11 has an endwise lineal travel between the stop 18 and reciprocating means 16 sufficient to move out of contact with the reciprocating means 16.

The reciprocating means may be a wobble plate, a cam surface, an electric vibrator, a lever, or a bell crank as desired to produce a reciprocating powered action. In the preferred embodiment disclosed in FIG. 1, the reciprocating means 16 comprises an outer bearing race 25 abutting the blade 11, and an inner bearing race 26 secured on a rotating shaft 27 such as by a pin 28. The bearing races 25 and 26 may be separated by ball bearings 29.

The outer race 25 may be rotationally stationary relative to the rotating inner race 26. This allows the outer race 25 to abut the blade 11 without sliding thereagainst. The races 25 and 26 lie at an angle to a plane normal to the shaft 27 axis to produce a camming or wobble effect during rotation of the shaft 27 and inner race 26.

The shaft 27 may be driven by an air turbine or a motor disposed within the housing 10. An air motor 30 may comprise a first bladed wheel 31 and a second bladed wheel 32 fixed on the shaft 27. The turbine wheels 31 and 32 may be separated by a stationary reaction stator to properly receive air emitting from the first wheel 31 and to properly direct the air to the second wheel 32.

A nozzle plate 34 may be disposed ahead of the first turbine wheel 31 and have angular channels 35 disposed therein for properly impinging the air against the first turbine wheel 31. An air chamber 36 may be disposed ahead of the plate 34 and air may be directed to the chamber 36 from an air hose 37, a channel 38 in the housing 10, valve means 39, and a channel 40.

The valve means 39 comprises a valve stem 41 having a head 42 lying against a seat in the channel chamber 43. Sealing means 44 may be disposed around the stem 41. A socket 45 may be formed on the housing 10 and handle 46 may be inserted in the socket 45. The handle hand has a ring 48 fixed thereon within the socket 45 and a spring 47 within the socket 45 bears on the ring 48 urging the handle 46 outwardly relative to the socket 45. The handle 46 has an internal web 49 and an adjusting screw 50 is threaded in the web 49 and abuts the valve stem 41. The outer end 51 of the handle 46 is removable so that a tool, not shown, may be inserted in the handle to adjust the adjusting screw 50.

The operator adjusts the adjusting screw 50 against the valve stem 41 to move the valve head 42 slightly off the seat to permit a relatively small volume of air to pass the valve head. This small volume of air drives the turbine blade wheels 31 and 32 at the idling speed and this may be around 10,000 r.p.m. After the user has the adjusting bolt 50 properly adjusted, he may withdraw the tool and replace the handle end 51.

Upon a workman using the tool, he places one hand on the housing 10 and the other hand on the handle 46. In the forward scraping movement of the entire tool he urges the handle 46 inwardly whereupon the handle ring 48 compresses the spring 47 and the adjusting screw 50 moves against the valve stem 41 causing the valve head 42 to move completely off its seat thereby allowing a full supply of air to travel from the air line 37 to the turbine wheels 31 and 32 to drive the air motor at its maximum speed which may be around 50,000 r.p.m.

Upon the workman moving the tool in a rearward scraping stroke, he releases inward force on the handle 46 and/or he pulls the handle 46 outwardly thereupon allowing the air to force the valve head 42 into its adjusted slightly spaced relationship relative to its seat thereby reducing the air supply to the air motor so that it is only powered at idling speed during the rearward scraping motion or during periods of non-use.

Referring to the embodiment of FIG. 2, the blade may be supported for endwise travel as previously set forth. The power means may be an electric motor 60 having a shaft 61 supported in a bearing 62 and extending towards the blade 63. The end of the shaft 61 may be angled so as to constitute a cam surface 64 or a wobble plate relative to the inner end of the blade 63. The blade 63 contacts the face 64 adjacent the periphery of the shaft 61. Upon energizing the electric motor 60, the shaft 61 rapidly revolves with the angular surface 64 of the shaft moving camwise or as a wobble plate relative to the inner end of the blade 63.

Upon urging the end of the blade 63 against a workpiece surface in the embodiment seen in FIG. 2, the inner end of the blade 63 is moved inwardly into contact with the angular surface 64 of the shaft 61 whereupon the blade 63 is moved outwardly by the cam action of the angular surface 64. The shaft rotates with continued forward scraping movement of the entire tool, and the blade 63 is moved outwardly by the high portion of the cam surface 64 and is allowed to move inwardly by the low point of the cam surface 64 as urged rearwardly by workpiece contact in forward scraping motion.

The angular disposition of the races in FIG. 1 and the shaft end surface 64 of FIG. 2 are shown to an exaggerated degree. In other words, their angulation relative to a plane normal to the shaft axis is exaggerated for the purpose of illustration.

The cam or wobble plate surfaces during one revolution have a relatively very small axial travel. This may be as low as .009 in 50,000 r.p.m.; .045 at 10,000 r.p.m.; or .450 at 1,000 r.p.m. With these distances of axial travel or variation relative to their stated rotational speed, they are coordinated to produce a cumulative axial travel of approximately 7.5 inches per second. These figures are stated as exemplary and are not intended to be limiting as other speeds and axial travels may be used as desired.

Usually, a workman has a motion of between 6 and 7 inches per second of forward scraping stroke. His time of retracting or rearward travel is immaterial because the tool is not power operated during this time. Thus, if the workman advances the tool 6 or 7 inches in its advancing travel, the forward motion of the tool produces a reaction to affect an equal inward motion in the blade. This tends to return the blade an equal distance inwardly.

The blade may be advanced by the reciprocating means in the design approximately 7.5 inches per second as described. A forward stroke takes a second. During half the time of the advancing stroke no inward travel of the blade is permitted as during this time it is being driven outwardly. Thus, there is an excess of movement embodied in the preferred design of approximately half the distance of the usual forward scraping stroke. In the described embodiment of 7½ inches this excess may be 3 inches. Therefore, the tool may accommodate a 9 or 10 inch forward scraping stroke per second with a designed 7.5 inch power travel per second.

In operation, the workman grasps the tool by the handle with one hand and grasps the housing with the other hand lying between the hand abutments incorporated with the housing. He then moves the entire tool in a forward scraping stroke while at the same time engaging the blade scraping end 12 with the surface of the workpiece 17. Upon the blade end 12 contacting the surface of the workpiece 17, the blade 11 is moved inwardly against the reciprocating means 16.

Continued forward stroke motion of the tool continues the inwardly directed force on the blade 11 continually forcing it inwardly by the reaction at the surface of the workpiece 17. Upon the blade 11 being forced inwardly against the reciprocating means 16 in conjunction with forward tool travel, the reciprocating means 16 drives the blade 11 outwardly overcoming the reaction between the blade scraping end 12 and the surface of the workpiece 17.

This is a pulse power movement of the blade and this pulse travel may be between approximately .010 to .500 inch depending on the angulation of the reciprocating means or its length of travel taken together in conjunction with the speed of rotation or reciprocation.

The powered pulse movement of the blade in the outward direction drives the blade quickly and forcefully forwardly over the surface of the workpiece 17 under the pressure applied to the scraping end 12 of the blade by the downward force exerted by the workman. The blade 11 outward pulse movements are rapid and strong and consequently effective to remove material from the surface of the workpiece 17.

Upon the workman terminating his forward scraping stroke motion of the entire tool, the reciprocating means 16 moves the blade 11 outwardly and, since there is no tool forward motion to generate a reaction between the blade scraping end 12 and the surface of the workpiece 17 to move the blade inwardly, the blade lies outwardly of the reciprocating means 16 without force to return it against the reciprocating means 16 thereby neutralizing the outward driven power pulses. Thus, upon termination of the forward scraping stroke, there is no opportunity for the blade to vibrate against the workpiece surface.

Upon the workman dragging the tool in a rearward scraping stroke with the blade scraping end 12 dragging against the surface of the workpiece 17, the reaction between the blade scraping end 12 and the surface of the workpiece 17 places a dragging force on the blade 11 tending to move the blade 11 outwardly of the housing and farther away from the reciprocating means 16 as limited by the stops 18.

Upon lifting the tool and the blade scraping end 12 off a workpiece, the reciprocating means 16 moves the blade outwardly and since there is no return force imposed on the blade 11, it lies outwardly of the reciprocating means 16 in a neutral position.

Upon the user again starting a forward scraping stroke of the tool, the blade scraping end 12 is again reacted against the surface of the workpiece 17 with consequent inwardly directed force on the blade 11 moving it into contact with the reciprocating means 16 whereupon it is driven outwardly overcoming the inward force in power pulses against the surface of the workpiece 17 to remove material therefrom.

It is now obvious that, when moving the tool rearwardly with the blade 11 dragging, the blade 12 lies idle and is not outwardly pulsed during the rearward stroke of the tool so that it can not pulse outwardly on the tool return scraping stroke to nick or mar the workpiece surface.

It is also believed obvious that after lifting the tool above a workpiece surface, that the blade 11 lies outwardly of the reciprocating means 16 so that any accidental touching of the workpiece surface with the blade 12 does not move the blade 11 inwardly against the reciprocating means so that there is no forward driving power pulses applied to the blade at the time.

With the two speed air motor as seen in FIG. 1, advancing pressure on the handle 46 opens the valve 62 fully to increase the power to the air motor to powerfully drive the reciprocating means during the forward scraping stroke. Upon the user moving the tool in the rearward scraping stroke, he takes the forward pressure off the handle 46 and the spring 47 moves the handle 46 endwise outwardly relieving the pressure on the valve 42 allowing it to move to its normally partially closed position throttling down air supply to the air motor to reduce its speed on the return stroke and to conserve air.

In the device seen in FIG. 2, an electric motor 60 is shown of the rotational type. However, this may be an electric vibrator or other oscillatory or reciprocating means to move the blade 63 in outward power pulses upon blade moving inwardly into contact with the reciprocating, oscillating or pulsing means.

The preferred power reciprocating means disclosed and described have a smooth sine wave path providing a simple harmonic motion. This allows gradual deceleration in axial movement to a full momentary stop in axial movement. This allows gradual acceleration in axial movement from a full momentary stop in axial movement. This allows highest axial movement speeds between stops. This eliminates any hammer blow action between the power reciprocating means and the blade and between the blade and a workpiece.

The power scraper tool of the invention only drives the blade in a forward powered scraping stroke. It never uses power to retract the blade. It never retracts the blade relative to a workpiece surface in the manual forward tool movement. It always starts its next stroke where the last stroke left off. It leaves the blade at its farthest point of forward power stroke and overtravels the blade with the housing. This repositions the blade relative to the housing rather than to the workpiece surface.

As only the blade is driven and as it is only driven in one direction, relatively small power is required compared to a device which reciprocates not only the blade in both directions but also the connecting means. Moreover, just the connecting means takes considerable power to drive.

The blade is changed simply by pulling out the old blade and pushing in the new blade.

Although but two preferred embodiments of the invention have been disclosed and described in detail, it is obvious that many changes may be made in the size, shape, speed, angulation, and travel of the various elements of the invention within the scope of the appended claim.

I claim:

A scraping tool movable in a forward scraping stroke over a workpiece surface to remove material therefrom comprising a housing,
  a blade extending from said housing,
  bearings supporting said blade for free lineal travel,
    an outer end on said blade for scraping a workpiece,
  reciprocating means constituting stop means relative to said blade limiting blade inward travel;
  said blade normally being out of contact with said reciprocating means;
  said blade being movable inwardly against said reciprocating means by engaging a workpiece surface with said blade outer end and moving said tool in a forward scraping stroke;
  said blade being alternately driven out by said reciprocating means and returned by workpiece engagement in the forward scraping stroke;
  said reciprocating means having a shaft;
  a bearing assembly on said shaft including an inner bearing race fixed on said shaft at a helical angle relative to said shaft and rotating with said shaft, and an outer bearing race anti-frictionally surrounding said inner bearing race;
  said outer race having a segment lying in the plane of said blade for axially contacting said blade at its inner end;
  said bearing races constituting a wobble plate for moving a segment of said outer bearing race towards and away from said blade inner end;
  said outer bearing race being capable of wobbling axially while standing rotationally stationary in contact with said blade inner end to obviate frictional engagement with said blade inner end;
a motor driving said reciprocating means,
power supply means leading to said motor;
power control means in said power supply means for selectably delivering full power and less than full power to said motor,
and actuating means operating said control means to allow full power supply to said motor during a forward scraping motion of said tool and to allow less than full power supply to said motor when said tool is not moving in a forward scraping stroke.

References Cited in the file of this patent

UNITED STATES PATENTS

| | | | |
|---|---|---|---|
| 712,843 | Paul | | Nov. 4, 1902 |
| 1,242,479 | Russell | | Oct. 9, 1917 |
| 1,267,698 | Roberts et al. | | May 28, 1918 |
| 1,609,136 | Stevens | | Nov. 30, 1926 |
| 1,660,134 | Mernit | | Feb. 21, 1928 |
| 1,787,229 | Zimmermann | | Dec. 30, 1930 |
| 1,838,186 | Moodhe | | Dec. 29, 1931 |
| 2,161,335 | Cherry | | June 6, 1939 |
| 2,270,596 | Medlen | | Jan. 20, 1942 |
| 2,589,138 | Reno | | Mar. 11, 1952 |
| 2,592,649 | Brackett | | Apr. 15, 1952 |
| 2,638,749 | Sparano | | May 19, 1953 |
| 2,722,072 | Aspeek | | Nov. 1, 1955 |
| 2,859,676 | Pottol et al. | | Nov. 11, 1958 |

FOREIGN PATENTS

| | | | |
|---|---|---|---|
| 549,704 | Germany | | Apr. 30, 1932 |